(12) United States Patent
Zhao et al.

(10) Patent No.: US 12,510,481 B2
(45) Date of Patent: Dec. 30, 2025

(54) FAR-FIELD OPTICAL ULTRATHIN SLICE IMAGING SYSTEM AND METHOD

(71) Applicant: NORTHWEST UNIVERSITY, Xi'an (CN)

(72) Inventors: Wei Zhao, Xi'an (CN); Ce Zhang, Xi'an (CN); Yueqiang Zhu, Xi'an (CN)

(73) Assignee: NORTHWEST UNIVERSITY, Xi'an (CN)

( * ) Notice: Subject to any disclaimer, the term of this patent is extended or adjusted under 35 U.S.C. 154(b) by 194 days.

(21) Appl. No.: 18/574,788

(22) PCT Filed: Aug. 24, 2022

(86) PCT No.: PCT/CN2022/114392
§ 371 (c)(1),
(2) Date: Dec. 28, 2023

(87) PCT Pub. No.: WO2023/274422
PCT Pub. Date: Jan. 5, 2023

(65) Prior Publication Data
US 2024/0344987 A1    Oct. 17, 2024

(30) Foreign Application Priority Data
Jul. 1, 2021  (CN) .......................... 202110750318.1

(51) Int. Cl.
*G01N 21/64*    (2006.01)
*G01N 33/483*    (2006.01)

(52) U.S. Cl.
CPC ..... *G01N 21/6458* (2013.01); *G01N 21/6402* (2013.01); *G01N 21/6428* (2013.01);
(Continued)

(58) Field of Classification Search
CPC ........... G01N 21/6458; G01N 21/6402; G01N 21/6428; G01N 33/4833;
(Continued)

(56) References Cited

U.S. PATENT DOCUMENTS

| 10,605,733 B1 | 3/2020 | Wu et al. |
| 2004/0028566 A1 | 2/2004 | Ko et al. |

(Continued)

FOREIGN PATENT DOCUMENTS

| CN | 107272180 A | 10/2017 |
| CN | 107430264 A | 12/2017 |

(Continued)

OTHER PUBLICATIONS

Yueqiang Zhu, et al., Aberration on excitation focal spot caused by oblique interface with refractive indices discontinuous and its correction with pure-phase compensation for laser scanning microscopy, Journal of Microscopy, 2021, pp. 1-11.

*Primary Examiner* — Kiho Kim
(74) *Attorney, Agent, or Firm* — Bayramoglu Law Offices LLC

(57) ABSTRACT

A far-field optical ultrathin light sheet imaging system and method are provided. The imaging system comprises a laser device, a beam modulation module, an objective lens, a control box of the microfluidic chip, a microfluidic chip, a narrow bandpass filter, an imaging lens, and an imaging device, wherein the beam modulation module modules a single laser beam emitted by the laser device, and the single laser beam is incident on a pupil aperture plane of the objective lens and then being converged to generate an ultrathin light sheet inside a channel of the microfluidic chip; the microfluidic chip controls a flow of fluorescently labeled cell samples through the control box of the microfluidic chip; fluorescence emitted by the cells is collected onto the (Continued)

imaging device through the narrow bandpass filter and the imaging lens.

5 Claims, 5 Drawing Sheets

(52) U.S. Cl.
CPC . *G01N 33/4833* (2013.01); *G01N 2021/6439* (2013.01); *G01N 2201/0636* (2013.01)

(58) Field of Classification Search
CPC ... G01N 2021/6439; G01N 2201/0636; G01N 21/84; G01N 21/01; G01N 21/6486; G01N 2021/0112; B01L 3/5027; B01L 2200/12

See application file for complete search history.

(56) References Cited

U.S. PATENT DOCUMENTS

| | | | |
|---|---|---|---|
| 2015/0021502 A1* | 1/2015 | Vangbo | F16K 99/0015 251/61.2 |
| 2017/0293130 A1 | 10/2017 | Huang et al. | |
| 2018/0275045 A1* | 9/2018 | Bassi | G01N 15/1434 |

FOREIGN PATENT DOCUMENTS

| | | |
|---|---|---|
| CN | 108398774 A | 8/2018 |
| CN | 108444897 A | 8/2018 |
| CN | 110618131 A | 12/2019 |
| CN | 112986063 A | 6/2021 |
| CN | 113484320 A | 10/2021 |
| CN | 114112864 A | 3/2022 |

\* cited by examiner

FAR-FIELD OPTICAL ULTRATHIN SLICE IMAGING SYSTEM AND METHOD

CROSS REFERENCE TO THE RELATED APPLICATIONS

This application is the national phase entry of International Application No. PCT/CN2022/114392, filed on Aug. 24, 2022, which is based upon and claims priority to Chinese Patent Application No. 202110750318.1, filed on Jul. 1, 2021, the entire contents of which are incorporated herein by reference.

TECHNICAL FIELD

The present invention relates to the technical field of optical and biomedical devices, and in particular to a far-field optical ultrathin light sheet imaging system and method.

BACKGROUND

The 3D structure of a biological sample directly determines its biomechanical properties and the functions it performs in biological phenomena. The rapid and high-resolution measurement of the 3D structure of biological samples is currently at the forefront and a hotspot of research in the fields of biomedical and optical technology. Currently, optical techniques that can achieve high-resolution measurement of the 3D structure of biological samples mainly include confocal microscopy, stimulated emission depletion microscopy, saturated structured illumination microscopy, stochastic location imaging microscopy, and light sheet imaging technology.

When using scanning microscopes for biological imaging, e.g. using confocal microscopes and stimulated emission super-resolution microscopes for biological cells imaging, it is typically done by scanning the biological cells line by line and column by column. Due to the fact that the fluorescence spot converged by the laser device through the microscope objective lens usually consists of only one fluorescence spot, the scanning of biological cells line by line and column by column takes a longer time, resulting in a slower imaging speed. This is highly unfavorable for living cell imaging and biological cells with poor photobleaching resistance. In addition, due to the influence of depth of focus, whether confocal microscopy, stimulated emission depletion microscopy, saturated structured illumination microscopy, or stochastic location imaging microscopy, all these techniques have lower spatial resolution along the optical axis and imaging direction, resulting in lower recognition of biological sample structures in the optical axis direction.

To address the issue of low spatial resolution caused by the depth of focus and improve the speed of 3D imaging, the light sheet imaging technique has emerged. Through the movement of the sample and other approaches, along with the use of a camera, the fluorescence distribution of the illuminated regions in each layer of the light sheet is captured. This enables the obtaining of high-resolution biological images in the imaging depth of focus direction, which can then be used for 3D reconstruction to obtain high-resolution biological structures. However, this technique typically generates the light sheet from a lateral direction of the imaging lens. In order to generate a thin light sheet while maintaining a long working distance, specially designed lenses are often required. Moreover, the thickness of the light sheet is typically on the order of micrometers, and the resolution in the depth of focus direction is still low. In addition, the movement of biological samples requires the use of mechanical or piezoelectric translation stages which move slowly. Consequently, the speed of layer by layer imaging is slow, and 3D imaging takes a longer time, making it unsuitable for biomedical testing. Therefore, it is urgent for those skilled in the art to address the challenge of continuous, high-resolution and high-throughput light sheet imaging and 3D reconstruction analysis of the 3D fluorescence distribution of biological samples such as cells and drug molecules.

SUMMARY

In view of this, the present invention provides a far-field optical ultrathin light sheet imaging system and method that enables continuous, high-resolution and high-throughput light sheet imaging and 3D reconstruction analysis of the 3D fluorescence distribution of biological samples such as cells and drug molecules.

In order to achieve the above objective, the present invention provides the following technical solutions:

A far-field optical ultrathin light sheet imaging system, comprising: a laser device, a beam modulation module, an objective lens, a control box of the microfluidic chip, a microfluidic chip, a narrow bandpass filter, an imaging lens, and an imaging device;

the laser device emits a single laser beam, and the single laser beam is incident on the beam modulation module; the beam modulation module modulates the incident single laser beam, and the incident single laser beam is incident on a pupil aperture plane of the objective lens; the objective lens focuses the incident beam on the pupil aperture plane, converging the incident beam to generate an ultrathin light sheet inside a channel of the microfluidic chip; the microfluidic chip controls a flow of fluorescent dyes through the control box of the microfluidic chip; the control box of the microfluidic chip controls a flow of fluorescently labeled cell samples, fluorescence emitted by the cells is collected onto the imaging device through the narrow bandpass filter and the imaging lens.

Preferably, the beam modulation module comprises a spatial light filter, a first small aperture diaphragm, a single lens, a polarizer, a beam splitter, a second small aperture diaphragm, a phase-only reflective liquid crystal spatial light modulator, a quarter-wave plate, a first reflector, and a second reflector, wherein the spatial light filter, the first small aperture diaphragm and the single lens sequentially filter, expand and collimate a single laser beam emitted by the laser device to modulate a linearly polarized beam with a transverse electromagnetic mode (TEM), and the linearly polarized beam is incident on the polarizer;

the polarizer modulates a polarization direction of the linearly polarized beam to match a working direction of a liquid crystal panel of the phase-only reflective liquid crystal spatial light modulator, and the linearly polarized beam is incident on the beam splitter;

the beam splitter splits the linearly polarized beam passing through the polarizer into two parts, and after passing through the second small aperture diaphragm, the one part is vertically incident on the liquid crystal panel of the phase-only reflective liquid crystal spatial light modulator, where the light beam is phase-modulated into a Bessel-Gaussian beam array and is reflected onto the quarter-wave plate;

the quarter-wave plate converts the Bessel-Gaussian beam array into a circularly polarized light, and then the circularly polarized light is incident on the pupil aperture plane of the objective lens through the first reflector and the second reflector.

Preferably, the microfluidic chip comprises three cube faces with functional structures: cube face 1, cube face 2, and cube face 3, wherein the cube face 1 comprises a liquid inlet S01, a liquid inlet S02, a liquid inlet S03, a liquid inlet S04, and a microfluidic valve S05, a microfluidic valve S06, a microfluidic valve S07 and a microfluidic valve S08 controlled by a flexible membrane; the liquid inlet S01 and the liquid inlet S03 introduce a sheath fluid into channels, the liquid inlet S02 introduces a solution containing cells into a channel, and the liquid inlet S04 supplies liquids to a peristaltic pump of the chip; the microfluidic valve S05 controls an entry of cells and sheath fluids into the microfluidic chip, and the microfluidic valve S06, the microfluidic valve S07 and the microfluidic valve S08 work in coordination to control the peristaltic pump to drive a liquid forward in a stepping manner;

the cube face 2 comprises a detection electrode S09, a detection electrode S10, a detection electrode S13, and an ultrathin chip excitation area S11; the detection electrode S09, the detection electrode S10 and the detection electrode S13 detect a flow of liquid; the ultrathin chip excitation area S11 excites cells to emit fluorescence;

the cube face 3 comprises a liquid outlet S12 for outputting the detected cells.

A far-field optical ultrathin light sheet imaging method, comprising the following steps:

step 1, emitting, by a laser device, a single laser beam, the single laser beam being incident on a beam modulation module;

step 2, modulating, by the beam modulation module, the incident single laser beam, the incident single laser beam being incident on a pupil aperture plane of an objective lens;

step 3, focusing, by the objective lens, the beam incident on the pupil aperture plane, converging the incident beam to generate an ultrathin light sheet inside a channel of a microfluidic chip;

step 4, controlling, by the microfluidic chip, a flow of fluorescently labeled cell samples through a control box of the microfluidic chip; collecting fluorescence emitted by the cells onto an imaging device through a narrow bandpass filter and an imaging lens.

Preferably, in the step 2, modulating the incident single laser beam comprises the following steps:

step 201, sequentially filtering, expanding and collimating, by a spatial light filter, a first small aperture diaphragm and a single lens, a single laser beam emitted by the laser device to modulate a linearly polarized beam with a transverse electromagnetic mode (TEM), the linearly polarized beam being incident on a polarizer;

step 202, modulating, by the polarizer, a polarization direction of the linearly polarized beam to match a working direction of a liquid crystal panel of a phase-only reflective liquid crystal spatial light modulator, the linearly polarized beam being incident on a beam splitter;

step 203, splitting, by the beam splitter, the linearly polarized beam passing through the polarizer into two parts, the two parts, after passing through a second small aperture diaphragm, being vertically incident on the liquid crystal panel of the phase-only reflective liquid crystal spatial light modulator, where the two parts are phase-modulated into a Bessel-Gaussian beam array (light sheet) and is reflected onto a quarter-wave plate;

step 204, converting, by the quarter-wave plate, the Bessel-Gaussian beam into a circularly polarized light, the circularly polarized light then being incident on the pupil aperture plane of the objective lens through a first reflector and a second reflector.

Preferably, in the step 3, generating the ultrathin light sheet inside the channel of the microfluidic chip comprises the following steps:

step 301, dividing the pupil aperture plane of the objective lens into P strip regions with an equal diameter R, and changing uniformity of a light spot by adjusting a value of P;

step 302, further dividing each of the strip regions into Q small strip regions;

step 303, sequentially filling phase distribution into the small strip regions, and changing a value of the light spot by adjusting a value of Q, where the phase distribution is as follows:

$$\phi(x', y') = \frac{2\pi}{\lambda}\left[\frac{NA}{Rn_t}(x'\Delta x + y'\Delta y)\right] + \frac{2\pi}{\lambda}(\sqrt{x'^2 + y'^2})\tan\alpha,$$

wherein NA represents a numerical aperture of the objective lens, $\lambda$ represents a wavelength emitted by the laser device, R represents a radius of a pupil aperture of the objective lens, $n_t$ represents a refractive index of the objective lens, x' and y' represent orthogonal coordinates on the pupil aperture plane of the objective lens, $\Delta x$ and $\Delta y$ represent respectively a position of a focal point of a light spot in a focal region of the objective lens, $\alpha$ represents an apex angle of the axicon, and $\phi(x', y')$ is plotted as a phase diagram with grayscale values ranging from 0 to $2\pi$;

step 304, arranging Bessel-Gaussian lights closely to form an evenly distributed ultrathin light sheet by designing $\Delta x$ and $\Delta y$.

Preferably, in the step 4, a running process of the microfluidic chip comprises:

step 401, introducing a solution containing cells into the microfluidic chip through a liquid inlet S02, a sheath fluid through a liquid inlet S01 and a liquid inlet S03 simultaneously, adjusting a pressure at the liquid inlet S01, the liquid inlet S02 and the liquid inlet S03 to allow the cells to enter the microfluidic chip one by one, and keeping a microfluidic valve S05 open, and a microfluidic valve S06, a microfluidic valve S07 and a microfluidic valve S08 closed;

step 402, pressurizing the liquid inlet S01, the liquid inlet S02 and the liquid inlet S03 to drive a fluid to carry individual cells through a detection electrode S09, causing local electrical signal changes and triggering the control box of the microfluidic chip to emit a control signal to close the microfluidic valve S05 and stop fluid motion; activating, by the control signal, a control program to switch the microfluidic valve S06, the microfluidic valve S07 and the microfluidic valve S08, and using a sequential control logic to control a switch of the microfluidic valves to drive a fluid flow.

Preferably, in the step 4, an imaging process on the imaging device comprises:

step 403, driving, by the microfluidic valve S06, the microfluidic valve S07 and the microfluidic valve S08, cells to step towards a detection electrode S10, and after the detection electrode S10 detects an electrical signal generated by cells passing through, transmitting, by the control box of the microfluidic chip, a triggering signal to the imaging device, the imaging device starting continuous imaging;

step 404, driving, by the microfluidic valve S06, the microfluidic valve S07 and the microfluidic valve S08, cells to step towards a detection electrode S13, and after the detection electrode S13 detects an electrical signal generated by cells passing through, transmitting, by the control box of the microfluidic chip, a triggering signal to the imaging device, the imaging device stopping to capture images;

step 405, when no signal indicating a passing of a new cell is detected by the detection electrode S09, closing the microfluidic valve S06, the microfluidic valve S07 and the microfluidic valve S08, opening the microfluidic valve S05, carrying cells away from the microfluidic chip, and keeping the microfluidic chip in the state until operation is stopped;

step 406, when a signal indicating a passing of a new cell has been detected by the detection electrode S09, the microfluidic valve S06, the microfluidic valve S07 and the microfluidic valve S08 continuing to cycle until operation is stopped.

As can be seen from the above technical solutions, compared with the prior art, the present invention provides a far-field optical ultrathin light sheet imaging system and method. A single laser beam is modulated into a Bessel-Gaussian spot array through the spatial light modulation and phase segmentation techniques, forming ultrathin light sheets with greater width and height; and combined with microfluidic chip technology, fast, high-resolution, and high-throughput light sheet imaging of biological samples such as cells continuously passing through the light sheets in the channel is achieved. This is applicable in the biomedical field for far-field and 3D structural imaging of biological samples and drug molecules, serving the areas of biophysics, biomedical fundamental research, cell pharmacology, early screening of cancer cells, and other clinical applications.

BRIEF DESCRIPTION OF THE DRAWINGS

In order to more clearly illustrate the technical solutions in the embodiments of the present invention or in the prior art, the drawings required to be used in the description of the embodiments or the prior art are briefly introduced below. It is obvious that the drawings in the description below are merely embodiments of the present invention, and those of ordinary skilled in the art can obtain other drawings according to the drawings provided without creative efforts.

DETAILED DESCRIPTION OF THE EMBODIMENTS

The technical solutions in the embodiments of the present invention will be clearly and completely described below with reference to the drawings in the embodiments of the present invention, and it is obvious that the described embodiments are only a part of the embodiments of the present invention but not all of them. Based on the embodiments of the present invention, all other embodiments obtained by those of ordinary skilled in the art without creative efforts shall fall within the protection scope of the present invention.

Embodiment 1

A far-field optical ultrathin light sheet imaging method, comprising the following steps:

step 1, emitting, by a laser device, a single laser beam, the single laser beam being incident on a beam modulation module;

step 2, modulating, by the beam modulation module, the incident single laser beam, the incident single laser beam being incident on a pupil aperture plane of an objective lens;

step 3, focusing, by the objective lens, the beam incident on the pupil aperture plane, converging the incident beam to generate an ultrathin light sheet inside a channel of a microfluidic chip;

step 4, controlling, by the microfluidic chip, a flow of fluorescent dyes through a control box of the microfluidic chip; collecting, by the control box of the microfluidic chip, fluorescence onto a camera through a narrow bandpass filter and an imaging lens.

Further, in step 2, modulating the incident single laser beam comprises the following steps:

step 201, sequentially filtering, expanding and collimating, by a spatial light filter, a first small aperture diaphragm and a single lens, a single laser beam emitted by the laser device to modulate a linearly polarized beam with a transverse electromagnetic mode (TEM), the linearly polarized beam being incident on a polarizer;

step 202, modulating, by the polarizer, a polarization direction of the linearly polarized beam to match a working direction of a liquid crystal panel of a phase-only reflective liquid crystal spatial light modulator, the linearly polarized beam being incident on a beam splitter;

step 203, splitting, the beam splitter splits the linearly polarized beam passing through the polarizer into two parts, and after passing through the second small aperture diaphragm, the one parts are is vertically incident on the liquid crystal panel of the phase-only reflective liquid crystal spatial light modulator, where the light beam is phase-modulated into a Bessel-Gaussian beam array and is reflected onto the quarter-wave plate;

step 204, converting, by the quarter-wave plate, the Bessel-Gaussian beam array into a circularly polarized light, the circularly polarized light then being incident on the pupil aperture plane of the objective lens through a first reflector and a second reflector.

Figure 1:
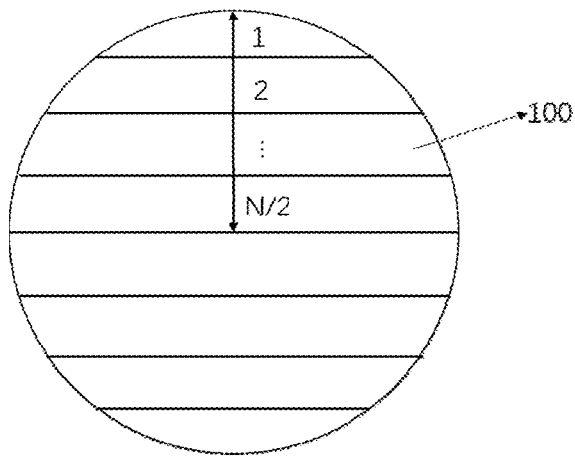
FIG. 1 is a schematic diagram of the phase distribution at the pupil aperture of an objective lens according to an embodiment.
Figure 2:
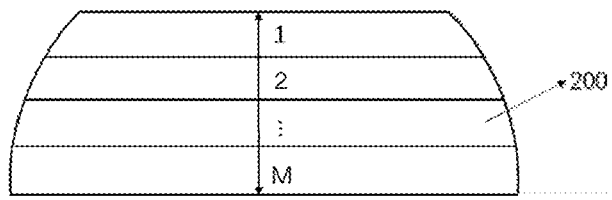
FIG. 2 is a schematic diagram of one of the strip subregions of the phase distribution at the pupil aperture of an objective lens according to an embodiment.

Further, in step 3, generating the ultrathin light sheet inside the channel of the microfluidic chip comprises the following steps:

as the schematic diagram of the phase distribution at the pupil aperture of the objective lens shown in FIG. 1, dividing the pupil aperture plane of the objective lens into P strip regions with an equal diameter R, where one of the subregions is shown as (100) in the figure, and changing uniformity of a light spot by adjusting a value of P;

as the schematic diagram of one of the strip subregions of the FIG. 1 shown in FIG. 2, further dividing each strip region into Q small strip regions, where one of the subregions is shown as (200) in the figure;

step 303, sequentially filling phase distribution into the small strip regions, and changing a value of the light spot by adjusting a value of Q, where the phase distribution is as follows:

$$\phi(x', y') = \frac{2\pi}{\lambda}\left[\frac{NA}{Rn_t}(x'\Delta x + y'\Delta y)\right] + \frac{2\pi}{\lambda}(\sqrt{x'^2 + y'^2})\tan\alpha,$$

wherein NA represents a numerical aperture of the objective lens, λ represents a wavelength emitted by the laser device, R represents a radius of a pupil aperture of the objective lens, $n_t$ represents a refractive index of the objective lens, x' and y' represent orthogonal coordinates on the pupil aperture plane of the objective lens, Δx and Δy represent respectively a position of a focal point of a light spot in a focal region of the objective lens, α represents an apex angle of the axicon, and ϕ(x', y') is plotted as a phase diagram with grayscale values ranging from 0 to 2π;

step 304, arranging Bessel-Gaussian lights closely to form an evenly distributed ultrathin light sheet by designing Δx and Δy.

Figure 3:
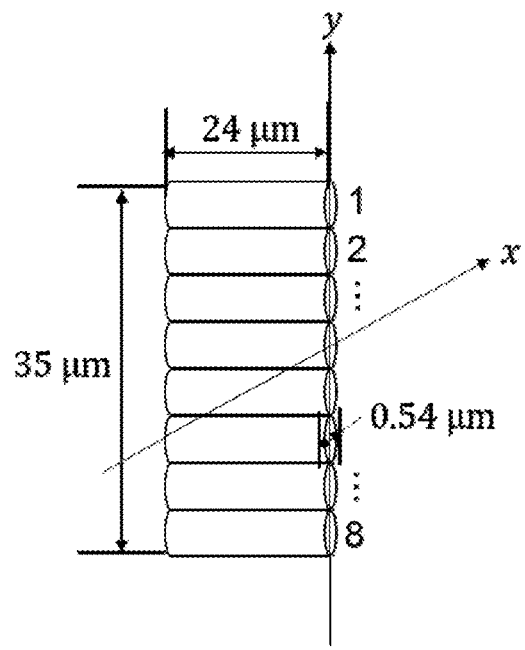
FIG. 3 is a schematic diagram of the calculation of the position coordinates of the focal point of the focal plane of the objective lens according to an embodiment.

FIG. 3 shows the schematic diagram of the calculation of the position coordinates of the focal point of the focal plane of the objective lens. By adjusting the number and distribution of multi-focal spots, the width, thickness, and height of the sheet-like spot can be adjusted. In the figure, numbers 1 to 8 represent eight focal spots. In an inverted fluorescence microscopy system, the width of the light sheet is obtained as 35 μm, the thickness is 0.54 μm and the height is simulated as 24 μm.

Figures 4A, 4B:
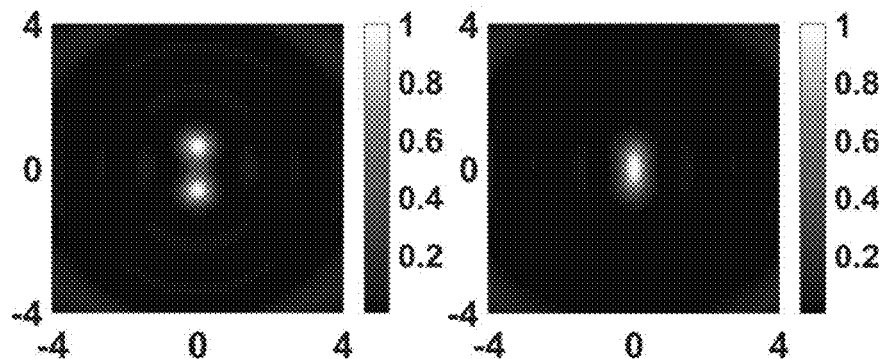
FIGS. 4A-4C are diagrams showing the simulated results on the focal region of the objective lens according to an embodiment, where two focal points are getting close to each other.
Figure 4C:
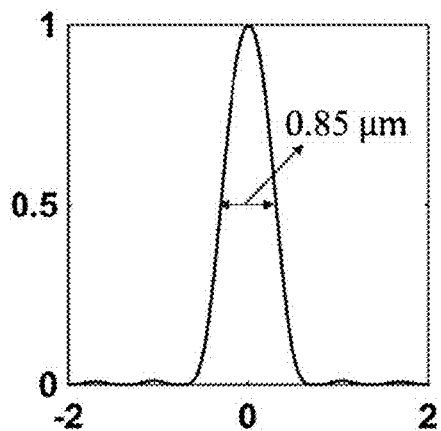

FIGS. 4A-4C show the simulated results of the focal region of the objective lens where two focal points are getting close to each other. FIGS. 4A and 4B, by taking two light spots as an example, show the gradual merging of the two light spots by adjusting the spacing therebetween. FIG. 4C shows the full width at half maximum of the transverse width of the sheet-like spot, which corresponds to the thickness of the light sheet (using a 20×/NA0.5 objective lens) as 0.85 μm.

Figure 5:
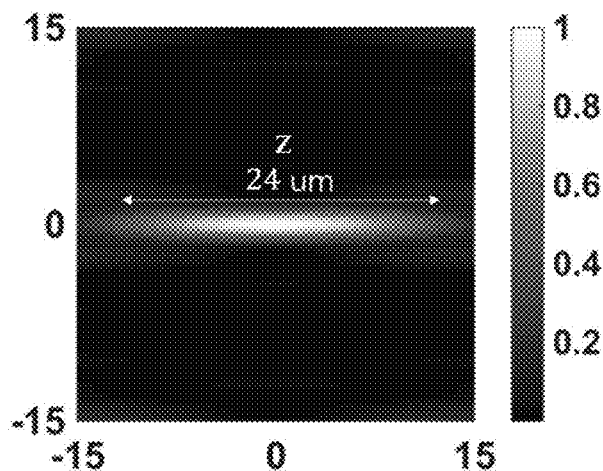
FIG. 5 shows the depth of focus in the Z-axis direction of the focal spot (using a 20×/0.5 objective lens) according to an embodiment.

As shown in FIG. 5, the depth of focus in the Z-axis direction of the focal spot (using a 20×/0.5 objective lens) is 24 μm.

Further, in step 4, the running process of the microfluidic chip comprises:

step 401, introducing a solution containing cells into the microfluidic chip through a liquid inlet S02, a sheath fluid through a liquid inlet S01 and a liquid inlet S03 simultaneously, adjusting a pressure at the liquid inlet S01, the liquid inlet S02 and the liquid inlet S03 to allow the cells to enter the microfluidic chip one by one, and keeping a microfluidic valve S05 open, and a microfluidic valve S06, a microfluidic valve S07 and a microfluidic valve S08 closed;

step 402, pressurizing the liquid inlet S01, the liquid inlet S02 and the liquid inlet S03 to drive a fluid to carry individual cells through a detection electrode S09, causing local electrical signal changes and triggering the control box of the microfluidic chip to emit a control signal to close the microfluidic valve S05 and stop fluid motion; activating, by the control signal, a control program to switch the microfluidic valve S06, the microfluidic valve S07 and the microfluidic valve S08, and using a sequential control logic (100, 110, 010, 011, 001) (where 1 indicates an open control valve allowing fluid flow and 0 indicates a closed control valve preventing fluid flow) to control a switch of the microfluidic valves to drive a fluid flow and generate a flow field, it being measured that the cells are driven forward with a step length of 0.2 μm to 1.5 μm per cycle in the channels of the microfluidic chip, ranging from 10 μm×10 μm to 20 μm×20 μm in size.

Further, in step 4, the imaging process on the camera comprises:

step 403, driving, by the microfluidic valve S06, the microfluidic valve S07 and the microfluidic valve S08, cells to step towards a detection electrode S10, and after the detection electrode S10 detects an electrical signal generated by cells passing through, transmitting, by the control box of the microfluidic chip, a triggering signal to the camera, the camera starting continuous imaging;

step 404, driving, by the microfluidic valve S06, the microfluidic valve S07 and the microfluidic valve S08, cells to step towards a detection electrode S13, and after the detection electrode S13 detects an electrical signal generated by cells passing through, transmitting, by the control box of the microfluidic chip, a triggering signal to the camera, the camera stopping to capture images;

step 405, when no signal indicating a passing of a new cell is detected by the detection electrode S09, closing the microfluidic valve S06, the microfluidic valve S07 and the microfluidic valve S08, opening the microfluidic valve S05, carrying cells away from the microfluidic chip, and keeping the microfluidic chip in the state until operation is stopped;

step 406, when a signal indicating a passing of a new cell has been detected by the detection electrode S09, the microfluidic valve S06, the microfluidic valve S07 and the microfluidic valve S08 continuing to cycle until operation is stopped.

Embodiment 2

Figure 6:
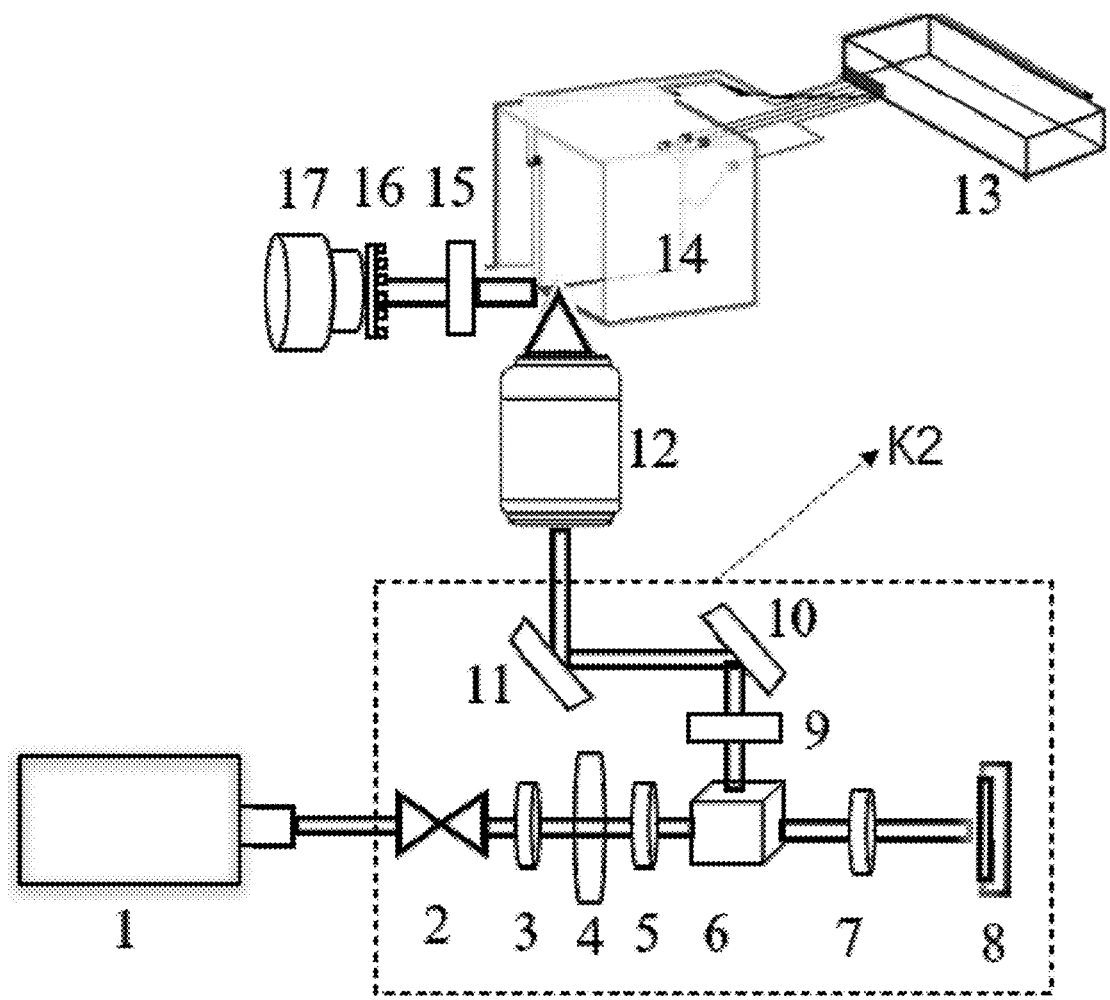
FIG. 6 is a schematic diagram of the imaging system according to the present invention.

FIG. 6 shows the schematic diagram of the structure of the far-field optical ultrathin light sheet imaging system according to the present invention, comprising a laser device 1, a beam modulation module K2, an objective lens 12, a control box of the microfluidic chip 13, a microfluidic chip 14, a narrow bandpass filter 15, an imaging lens 16, and a camera 17;

laser device 1 emits a single laser beam, and the single laser beam is incident on beam modulation module K2; beam modulation module K2 modulates the incident single laser beam and the incident single laser beam is incident on the pupil aperture plane of objective lens 12; objective lens 12 focuses the incident beam on the pupil aperture plane, converging the incident beam to generate an ultrathin light sheet inside the channel of microfluidic chip 14; microfluidic chip 14 controls the flow of fluorescently labeled cells through control box of the microfluidic chip 13; the fluorescence emitted by the cells is then collected onto camera 17 through narrow bandpass filter 15 and imaging lens 16.

In the far-field optical ultrathin light sheet imaging system, beam modulation module K2 comprises a spatial light filter 2, a first small aperture diaphragm 3, a single lens 4, a polarizer 5, a beam splitter 6, a second small aperture diaphragm 7, a phase-only reflective liquid crystal spatial light modulator 8, a quarter-wave plate 9, a first reflector 10, and a second reflector 11;

spatial light filter 2, first small aperture diaphragm 3, and single lens 4 sequentially filter, expand and collimate the single laser beam emitted by laser device 1 to modulate a linearly polarized beam with a transverse electromagnetic mode (TEM); the linearly polarized beam is incident on polarizer 5; polarizer 5 modulates the polarization direction of the linearly polarized beam to match the working direction of the liquid crystal panel of phase-only reflective liquid crystal spatial light modulator 8, and the linearly polarized beam is incident on beam splitter 6; beam splitter 6 splits the linearly polarized beam passing through polarizer 5 into two parts, and after passing through second small aperture diaphragm 7, the two parts are vertically incident on the liquid crystal panel of phase-only reflective liquid crystal spatial light modulator 8, where the two parts are phase-modulated into a Bessel-Gaussian beam and is reflected onto quarter-wave plate 9; quarter-wave plate 9 converts the Bessel-Gaussian beam into a circularly polarized light, and then the circularly polarized light is incident on the pupil aperture plane of objective lens 12 through first reflector 10 and second reflector 11.

Figure 7:
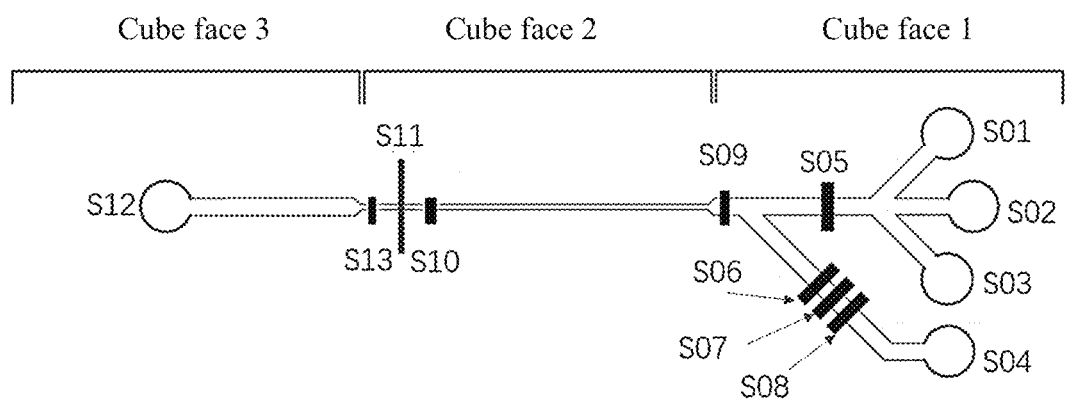
FIG. 7 is a schematic diagram of an overall structure of the microfluidic chip according to the present invention.

FIG. 7 shows the schematic diagram of the structure of the microfluidic chip which comprises three cube faces with functional structures: cube face 1, cube face 2, and cube face 3, wherein the cube face 1 comprises a liquid inlet S01, a liquid inlet S02, a liquid inlet S03, a liquid inlet S04, and a microfluidic valve S05, a microfluidic valve S06, a microfluidic valve S07, and a microfluidic valve S08 controlled by a flexible membrane; the liquid inlet S01 and the liquid inlet S03 introduce a sheath fluid into the channels, the liquid inlet S02 introduces a solution containing cells into the channel, and the liquid inlet S04 supplies liquids to a peristaltic pump of the chip; the microfluidic valve S05 controls the entry of cells and sheath fluids into the microfluidic chip 14, and the microfluidic valve S06, the microfluidic valve S07, and the microfluidic valve S08 work in coordination to control the peristaltic pump to drive the liquid forward in a stepping manner;

the cube face 2 comprises a detection electrode S09, a detection electrode S10, a detection electrode S13, and an ultrathin chip excitation area S11; the detection electrode S09, the detection electrode S10 and the detection electrode S13 detect the flow of liquid; the ultrathin chip excitation area S11 excites cells to emit fluorescence;

the cube face 3 comprises a liquid outlet S12 for outputting the detected cells.

Figure 8:
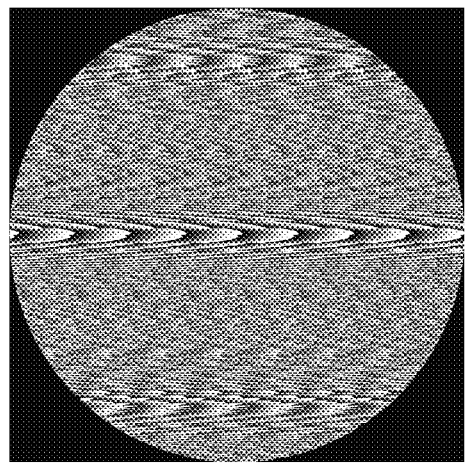
FIG. 8 is a phase diagram of loaded onto the liquid crystal panel of the phase-only reflective liquid crystal spatial light modulator according to the present invention.

FIG. 8 shows the phase diagram loaded onto the spatial light modulator, where the phase diagram is plotted in a 1080×1080 pixel PNG format.

Figure 9A:
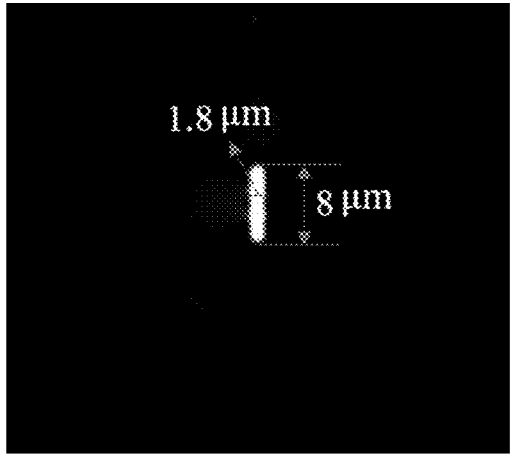
FIGS. 9A-9B show the experimental results of sheet-like spot generated by 25 focal spots according to an embodiment.
Figure 9B:
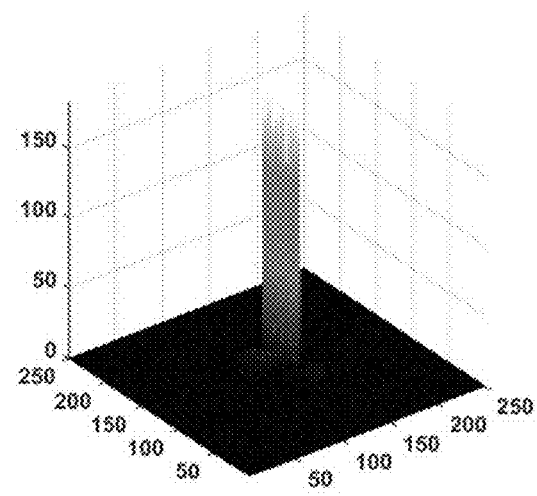

FIGS. 9A-9B show the experimental results of 25 fluorescence spots with a pairwise spacing of 1.2 μm FIG. 9B is the mesh diagram of FIG. 9A. Heights are obtained by simulating different lenses based on numerical simulation results, where the objective lens (10×/NA0.2) generates a light sheet with a thickness of 1.8 μm, a width of 8 μm, and a height of 25 μm.

Figure 10A:
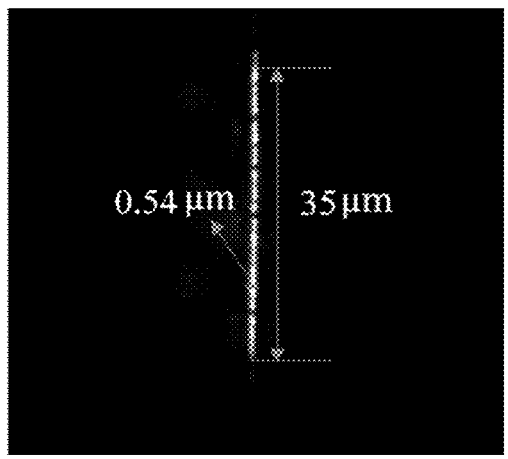
FIGS. 10A-10B show the experimental results of sheet-like spot generated by 151 focal spots according to another embodiment.
Figure 10B:
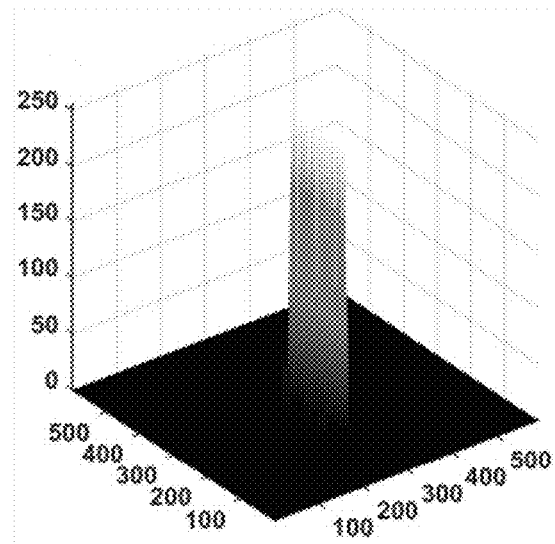

FIGS. 10A-10B show the experimental results of 151 fluorescence spots with a pairwise spacing of 0.32 μm FIG. 10B is the mesh diagram of FIG. 10A. Heights are obtained by simulating different lenses based on numerical simulation results, where the objective lens (63×/NA1.4) generates a light sheet with a thickness of 0.54 μma, a width of 35 μm, and a height of 6 μm. It should be emphasized that the width of the light sheet may be adjusted arbitrarily within a range of 50 μm by controlling the number of light spots.

The fluorescent dye used in the experiment was CY5 dye with an excitation peak of 651 nm and an emission peak of 670 nm.

Furthermore, one specific embodiment of the present invention comprises the following steps:

step 1, turning on the laser device, the spatial light modulator, and the power supply of the control box of the microfluidic chip, and modulating an ultrathin sheet-like spot by loading a phase diagram through the spatial light modulator;

step 2, fixing the cubic chip in the light sheet excitation area and imaging platform and connecting to the chip control device;

step 3, connecting 3T3 fibroblasts transfected with H2B-GFP histone at a concentration of 10,000 cells/mL to liquid inlet S02, and connecting the culture medium serving as the sheath fluid simultaneously to liquid inlet S01 and liquid inlet S03;

step 4, pressurizing the cell solution at 1 psi and the sheath fluid liquid inlet at 1.5 psi to introduce the cells into the microfluidic chip;

step 5, opening, by the system, microfluidic valve S05 according to the preset program, and when the first cell passes through detection electrode S09, activating the control program to initiates the imaging and reconstruction of the three-dimensional structure of the single-cell chromosome.

The conventional light sheet imaging technique typically generates the light sheet from a lateral direction of the imaging lens. In order to generate a thin light sheet while maintaining a long working distance, specially designed lenses are often required. Moreover, the thickness of the light sheet is typically on the order of micrometers, as a result, the resolution in the depth of focus direction remains low. The movement of biological samples requires the use of mechanical or piezoelectric translation stages which move slowly. Consequently, the speed of layer by layer imaging is slow, and 3D imaging takes a longer time, making it unsuitable for biomedical testing. However, in the present invention, a single laser beam is modulated into a Bessel-Gaussian spot array through the spatial light modulation and phase segmentation techniques, forming ultrathin light sheets with greater thickness, width, and height; and combined with microfluidic chip technology, fast, high-resolution, and high-throughput light sheet imaging of biological samples such as cells continuously passing through the light sheets in the channel is achieved. This is applicable in the biomedical field for far-field and 3D structural imaging of biological samples and drug molecules, serving the areas of biophysics, biomedical fundamental research, cell pharmacology, early screening of cancer cells, and other clinical applications.

The embodiments in the specification are all described in a progressive manner, and each embodiment focuses on differences from other embodiments, and portions that are the same and similar between the embodiments may be referred to each other. Since the system disclosed in the embodiment corresponds to the method disclosed in the embodiment, the description is relatively simple, and reference may be made to the partial description of the method.

The above description of the disclosed embodiments enables those skilled in the art to implement or use the present invention. Various modifications to these embodiments will be apparent to those skilled in the art, and the generic principles defined herein may be applied to other embodiments without departing from the spirit or scope of the present invention. Thus, the present invention is not intended to be limited to these embodiments shown herein but is to accord with the broadest scope consistent with the principles and novel features disclosed herein.

What is claimed is:

1. A far-field optical ultrathin light sheet imaging system, comprising a laser device, a beam modulation module, an objective lens, a control box of a microfluidic chip, the microfluidic chip, a narrow bandpass filter, an imaging lens, and an imaging device,
    wherein the laser device emits a single laser beam, and the single laser beam is incident on the beam modulation module; the beam modulation module modulates the incident single laser beam, and the incident single laser beam is incident on a pupil aperture plane of the objective lens; the objective lens focuses the incident single laser beam on the pupil aperture plane, converging the incident single laser beam to generate an ultrathin light sheet inside a channel of the microfluidic chip; the microfluidic chip controls a flow of fluorescent dyes through the control box of the microfluidic chip; the control box of the microfluidic chip collects fluorescence onto the imaging device through the narrow bandpass filter and the imaging lens;
    wherein the microfluidic chip comprises three cube faces with functional structures: a first cube face, a second cube face, and a third cube face,
    wherein the first cube face comprises a first liquid inlet, a second liquid inlet, a third liquid inlet, a fourth liquid inlet, and a first microfluidic valve, a second microfluidic valve, a third microfluidic valve and a fourth microfluidic valve controlled by a flexible membrane; the first liquid inlet and the third liquid inlet introduce a sheath fluid into channels, the second liquid inlet introduces a solution containing cells into a channel, and the fourth liquid inlet supplies liquids to a peristaltic pump of the microfluidic chip; the first microfluidic valve controls an entry of cells and sheath fluids into the microfluidic chip, and the second microfluidic valve, the third microfluidic valve and the fourth microfluidic valve work in coordination to control the peristaltic pump to drive a liquid forward in a stepping manner;
    the second cube face comprises a first detection electrode, a second detection electrode, a third detection electrode, and an ultrathin chip excitation area; the first detection electrode, the second detection electrode and the third detection electrode detect a flow of liquid; the ultrathin chip excitation area of the ultrathin light sheet excites cells to emit fluorescence;
    the third cube face comprises a liquid outlet for outputting the detected cells.

2. The far-field optical ultrathin light sheet imaging system according to claim 1, wherein the beam modulation module comprises a spatial light filter, a first small aperture diaphragm, a single lens, a polarizer, a beam splitter, a second small aperture diaphragm, a phase-only reflective liquid crystal spatial light modulator, a quarter-wave plate, a first reflector, and a second reflector,
    wherein the spatial light filter, the first small aperture diaphragm and the single lens sequentially filter, expand and collimate a single laser beam emitted by the laser device to modulate a linearly polarized beam with a transverse electromagnetic mode (TEM), and the linearly polarized beam is incident on the polarizer;
    the polarizer modulates a polarization direction of the linearly polarized beam to match a working direction of a liquid crystal panel of the phase-only reflective liquid crystal spatial light modulator, and the linearly polarized beam is incident on the beam splitter;
    the beam splitter splits the linearly polarized beam passing through the polarizer into two parts, and after passing through the second small aperture diaphragm, one part is vertically incident on the liquid crystal panel of the phase-only reflective liquid crystal spatial light modulator, where the light beam is phase-modulated into a Bessel-Gaussian beam array and is reflected onto the quarter-wave plate;
    the quarter-wave plate converts the Bessel-Gaussian beam array into a circularly polarized light, and the circularly polarized light is incident on the pupil aperture plane of the objective lens through the first reflector and the second reflector.

3. A far-field optical ultrathin light sheet imaging method, comprising the following steps:
    step 1, emitting, by a laser device, a single laser beam, wherein the single laser beam is incident on a beam modulation module;
    step 2, modulating, by the beam modulation module, the incident single laser beam being converted into a light sheet constituted of Bessel-Gaussian spot array, wherein the light sheet is incident on a pupil aperture plane of an objective lens;
    step 3, focusing, by the objective lens, the light sheet incident on the pupil aperture plane, converging the incident light sheet to generate an ultrathin light sheet inside a channel of a microfluidic chip;
    step 4, controlling, by the microfluidic chip, a flow of fluorescently labeled cell samples through a control box of the microfluidic chip; collecting fluorescence emitted by the cells onto an imaging device through a narrow bandpass filter and an imaging lens,
    wherein a running process of the microfluidic chip comprises:

step 401, introducing a solution containing cells into the microfluidic chip through a second liquid inlet, a sheath fluid through a first liquid inlet and a third liquid inlet simultaneously, adjusting a pressure at the first liquid inlet, the second liquid inlet and the third liquid inlet to allow the cells to enter the microfluidic chip one by one, and keeping a first microfluidic valve open, and a second microfluidic valve, a third microfluidic valve and a fourth microfluidic valve closed;

step 402, pressurizing the first liquid inlet, the second liquid inlet and the third liquid inlet to drive a fluid to carry individual cells through a first detection electrode, causing local electrical signal changes and triggering the control box of the microfluidic chip to emit a control signal to close the first microfluidic valve and stop fluid motion; activating, by the control signal, a control program to switch the second microfluidic valve, the third microfluidic valve and the fourth microfluidic valve, and using a sequential control logic to control a switch of the second to fourth microfluidic valves to drive a fluid flow; and an imaging process on the imaging device comprises:

step 403, driving, by the second microfluidic valve, the third microfluidic valve and the fourth microfluidic valve, cells to step towards a second detection electrode, and after the second detection electrode detects an electrical signal generated by cells passing through, transmitting, by the control box of the microfluidic chip, a triggering signal to the imaging device, the imaging device starting continuous imaging;

step 404, driving, by the second microfluidic valve, the third microfluidic valve and the fourth microfluidic valve, cells to step towards a third detection electrode, and after the third detection electrode detects an electrical signal generated by cells passing through, transmitting, by the control box of the microfluidic chip, a triggering signal to the imaging device, the imaging device stopping to capture images;

step 405, when no signal indicating a passing of a new cell is detected by the first detection electrode, closing the second microfluidic valve, the third microfluidic valve and the fourth microfluidic valve, opening the first microfluidic valve, carrying cells away from the microfluidic chip, and keeping the microfluidic chip in the state until operation is stopped;

step 406, when a signal indicating a passing of a new cell has been detected by the first detection electrode, the second microfluidic valve, the third microfluidic valve and the fourth microfluidic valve continuing to cycle until operation is stopped.

4. The far-field optical ultrathin light sheet imaging method according to claim 3, wherein in the step 2, modulating the incident single laser beam comprises the following steps:

step 201, sequentially filtering, expanding and collimating, by a spatial light filter, a first small aperture diaphragm and a single lens, a single laser beam emitted by the laser device to modulate a linearly polarized beam with a transverse electromagnetic mode (TEM), wherein the linearly polarized beam is incident on a polarizer;

step 202, modulating, by the polarizer, a polarization direction of the linearly polarized beam to match a working direction of a liquid crystal panel of a phase-only reflective liquid crystal spatial light modulator, wherein the linearly polarized beam is incident on a beam splitter;

step 203, the beam splitter splits the linearly polarized beam passing through the polarizer into two parts, and after passing through a second small aperture diaphragm, the one part is vertically incident on the liquid crystal panel of the phase-only reflective liquid crystal spatial light modulator, where the light beam is phase-modulated into a Bessel-Gaussian beam array and is reflected onto a quarter-wave plate;

step 204, converting, by the quarter-wave plate, the Bessel-Gaussian beam array into a circularly polarized light, wherein the circularly polarized light is incident on the pupil aperture plane of the objective lens through a first reflector and a second reflector.

5. The far-field optical ultrathin light sheet imaging method according to claim 3, wherein in the step 3, the operation of generating the ultrathin light sheet inside the channel of the microfluidic chip comprises the following steps:

step 301, dividing the pupil aperture plane of the objective lens into P strip regions with an equal diameter R, and changing uniformity of a light spot by adjusting a value of P;

step 302, further dividing each of the P strip regions into Q small strip regions;

step 303, sequentially filling a phase distribution into the Q small strip regions, and changing a value of the light spot by adjusting a value of Q, where the phase distribution is as follows:

$$\phi(x', y') = \frac{2\pi}{\lambda}\left[\frac{NA}{Rn_t}(x'\Delta x + y'\Delta y)\right] + \frac{2\pi}{\lambda}\left(\sqrt{x'^2 + y'^2}\right)\tan\alpha,$$

wherein NA represents a numerical aperture of the objective lens, $\lambda$ represents a wavelength emitted by the laser device, R represents a radius of a pupil aperture of the objective lens, $n_i$ represents a refractive index of the objective lens, x' and y' represent orthogonal coordinates on the pupil aperture plane of the objective lens, $\Delta x$ and $\Delta y$ represent respectively a position of a focal point of a light spot in a focal region of the objective lens, $\alpha$ represents an apex angle of an axicon, and $\phi(x', y')$ is plotted as a phase diagram with grayscale values ranging from 0 to $2\pi$;

step 304, arranging Bessel-Gaussian lights closely to form an evenly distributed ultrathin light sheet by designing $\Delta x$ and $\Delta y$.

* * * * *